C. JUNG.
PROCESS OF DEALCOHOLIZING BEVERAGES.
APPLICATION FILED JULY 17, 1908.
1,071,238.
Patented Aug. 26, 1913.
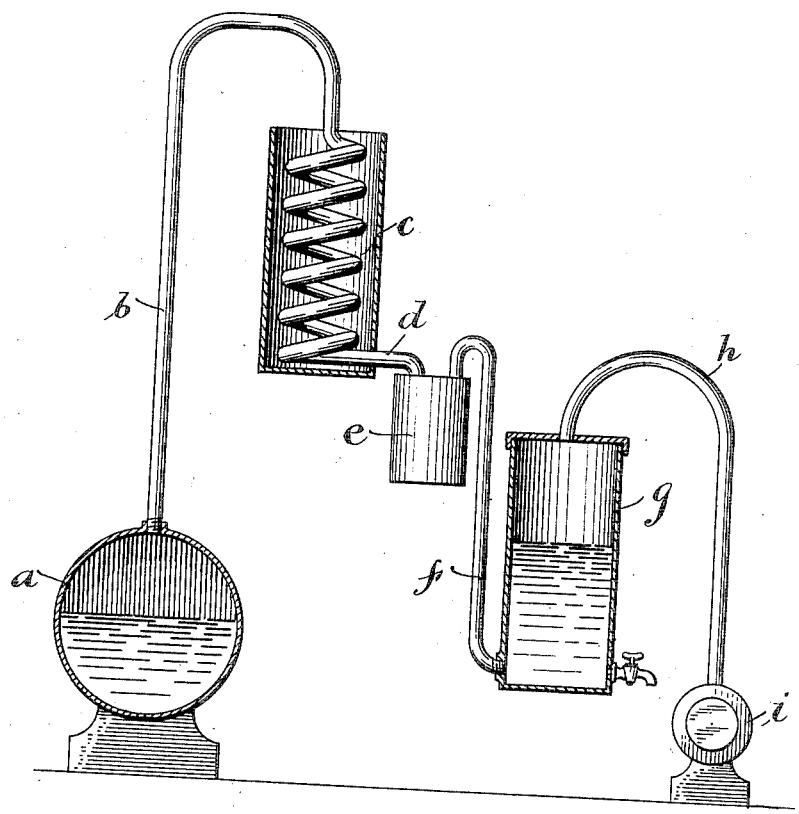

UNITED STATES PATENT OFFICE.

CARL JUNG, OF LORCH-ON-THE-RHINE, GERMANY.

PROCESS OF DEALCOHOLIZING BEVERAGES.

1,071,238.      Specification of Letters Patent.      Patented Aug. 26, 1913.

Application filed July 17, 1908. Serial No. 444,125.

*To all whom it may concern:*

Be it known that I, CARL JUNG, a citizen of the German Empire, residing at Lorch-on-the-Rhine, Germany, have invented new and useful Improvements in Processes of Dealcoholizing Beverages, of which the following is a specification.

My invention relates to improvements in the process of dealcoholization of naturally fragrant or of aromatized alcoholic beverages including all wines from grape, fruit, berries and the like, also beer and the object of my invention is the production of a non-alcoholic beverage having all the nature, appearance, and flavor, and in case of wine even the fine bouquet of the natural or original beverage and affording the same enjoyment, but without the exciting effects due to alcohol.

In describing my invention I refer to the accompanying drawing which illustrates a distilling apparatus as used in my process, in which $a$ represents a vessel containing the beverage intended for dealcoholization; $b$, a pipe leading from the said vessel to a condenser $c$. In the condenser the fluid passes through a worm-pipe which ends in a knee or elbow $d$ opening into a receptacle $e$ from which another pipe $f$ leads to a vessel $g$ which is in turn connected by a pipe $h$ with an air-pump $i$.

The disadvantage of processes heretofore used, having similar objects in view, resided in the fact that the pleasant odors and perfumes or aromatic constituents, which give the beverage in its original or natural state, its character, are permitted to distil off with the alcohol with which they are collected and condensed. In this way the aromatic constituents being conducted into the alcoholic distillate and retained therein the beverage, the subject of the treatment while freed from alcohol loses its bouquet and becomes insipid, in no way resembling the original beverage. In my process I overcome this difficulty by separating the substances having those pleasant odors from the alcohol contained in the beverage and restoring such substances to dealcoholized liquid, without permitting them to collect in the alcoholic distillate.

When the vessel $a$ has been filled with the beverage the air-pump $i$ is operated and at the same time the beverage is heated, the air-pump exhausting the air contained in the apparatus. The gradual heating of the wine or whatever beverage may be in the vessel, and the simultaneous diminution of the atmospheric pressure cause the volatilization of those substances which volatize at low temperature, such as ethyl aldehyde and acetic ether. These substances are carried over with the current of vapor passing through the conduit $b$, the worm-pipe $c$ and the elbow $d$ and arriving in the receptacle $e$ from which they pass through the pipe $f$ and enter the vessel $g$. The vessel $g$ contains a liquid of the same character as that being treated in the vessel $a$ except that its alcohol content has been previously removed and that there is preferably added to it or mixed with it some syrup of sugar. This liquid takes up and absorbs aromatic substances. When the contents of the vessel $a$ are at boiling point, which will depend in part upon the degree of exhaustion of air, the alcoholic and aqueous vapors ascend together with the aromatic substances which constitute the flavor or other characteristics of the natural beverage. As the alcoholic and aqueous vapors are heavier and less volatile and therefore quicker in changing from the gaseous into the liquid state they are the first to condense and they settle in a liquid state on the cool sides of the condenser worm $c$. To bring this about I regulate the temperature in the condenser and control the same so that the said condensed alcoholic matter will be received in the receptacle $e$ and remain therein. The aromatic vapors, however, proceed, unaccompanied by the alcohol, because they require a considerably lower temperature for their condensation, until they arrive in the vessel $g$ where they are absorbed by the mixture aforementioned, this absorption being favored by the low temperature which the aromatic vapors have acquired during their passage through the apparatus described.

When the distilling process as described has been completed, the dealcoholized beverage in the vessel $a$ may be cooled and mixed in proper proportion with the whole or part of the aromatic mixture contained in the vessel $g$. It may then be filtered (which should be done under exclusion of the air), impregnated with carbonic acid gas, bottled and pasteurized. The beverage thus obtained is of a pleasant taste and smell and may be preserved in bottles for years.

As an example of treating some particular substance by the process described, setting forth specific temperatures and manner of proceeding I herewith describe the dealcoholization and reflavoring of wine as follows: After the vessel a has been filled I warm the wine and operate the air-pump i already referred to. At the same time I warm the condenser water, bringing it to a temperature of about 25° C. or 77° F. which temperature I maintain during the whole process. When the wine has been warmed to a temperature of about 40° to 50° C., the volatile fragrant substances and the alcohol present in the wine begin to evaporate. The vapors pass into the condenser c the temperature of which is maintained so as to cause the condensation of only the more condensable substance viz., the alcohol vapors which are thus isolated and collected in the receptacle e while the more volatile aromatic flavors remain dephlegmated, that is, separated from the alcohol vapors without settling. Following the current of air produced by the air pump they pass in the form of vapor through the connecting pipe d, the receptacle e, the passage pipe f and enter the mixing vessel g where they are received and entirely absorbed by the fluid therein contained.

During the entire process of distillation care should be taken to maintain the proper relation between the temperature of the vapors rising from the vessel a and that of the condenser water so that there is always a difference of not less than about 20° C. which is requisite in order that there be no interruption in the dephlegmation of the bouquet vapors and that the most efficient separation of the aromatic flavors and their transition into the mixing vessel may take place. After the distilling process as described is completed the dealcoholized fluid in the mixing vessel g possesses a very agreeable odor corresponding with the bouquet of the wine and a delicious highly flavored and pleasant taste which acts exhilaratingly upon the gustatory nerves.

The novel features of my invention thus resides in the maintenance during distillation of conditions which will cause the alcohol to condense itself out of a mixture of vapors while the remaining vapors are passed on to a farther vessel wherein they are condensed in the fluid in which their properties are to be employed. In other words, in order to dealcoholize a beverage I not only remove the alcohol but several other constituents thereof and then by suitably extracting the alcohol from a mixture of vapors and returning the balance of the vapors to what is left of the original beverage I accomplish a dealcoholization without sacrificing any material part of the remaining properties of the original liquid; and by adapting the particular method described I am enabled to conserve practically the entire quantity of aromatic ingredients and to do this without any interruption during the distilling process.

I claim:

1. The process of treating beverages which consists in heating an alcoholic beverage causing the aromatic vapors and the alcoholic vapors to separate therefrom, condensing said alcoholic vapors from the mixture of vapors, drawing said aromatic vapors thus freed from alcohol into a body of dealcoholized liquid having the characteristics of the original beverage and absorbing said aromatic vapors in said liquid.

2. The process of treating beverages which consists in heating an alcoholic beverage causing the aromatic vapors and the alcoholic vapors to separate therefrom, condensing said alcoholic vapors from the mixture of vapors, drawing said aromatic vapors thus freed from alcohol into a body of dealcoholized liquid having the characteristics of the original beverage and absorbing said aromatic vapors in said liquid the entire system being maintained under reduced pressure throughout the process.

3. The process of preparing from alcoholic beverages, non-alcoholic beverages containing the aromatic characteristics of the former, which consists in distilling the alcoholic beverage under reduced pressure, absorbing the volatile aromatic elements thereof by non-alcoholic liquor at a temperature lower than that of the condensation of alcohol, the products of distillation as they come from the still being cooled in such manner that the alcohol and water settle in a separate collecting vessel while the aromatic elements retain their vapor form until they reach the absorption vessel, and subsequently mixing the contents of the absorption vessel with the liquid residuum left in the still after distillation.

In testimony whereof I have signed my name to this specification in the presence of two subscribing witnesses.

CARL JUNG.

Witnesses:
 Jos. Heh. Berlenbach,
 Bernhard Bayerlein.